D. A. Draper.

Forming Letters on Type Blocks.

No. 3442. Reissued May 18. 1869.

Witnesses,

R. C. Schumacher

N. W. Stearns

Inventor.

Daniel A. Draper

UNITED STATES PATENT OFFICE.

DANIEL A. DRAPER, OF CAMBRIDGE, MASSACHUSETTS.

IMPROVED DEVICE FOR FORMING LETTERS AND FIGURES ON TYPE-BLOCKS.

Specification forming part of Letters Patent No. 64,410, dated May 7, 1867; Reissue No. 3,442, dated May 18, 1869.

*To all whom it may concern:*

Be it known that I, DANIEL A. DRAPER, of Cambridge, in the county of Middlesex and State of Massachusetts, have invented an Improved Method of Producing Letters, Figures, &c., on the Edges of Type-Blocks for Hand-Stamps and for other purposes, of which the following is a full, clear, and exact description, reference being had to the accompanying drawings, making part of this specification, in which—

Figure 1:
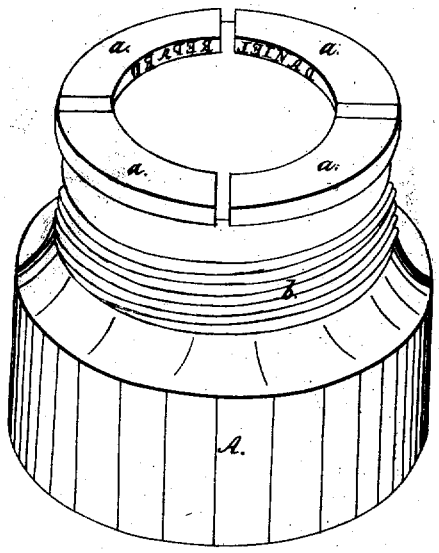
Figure 2:
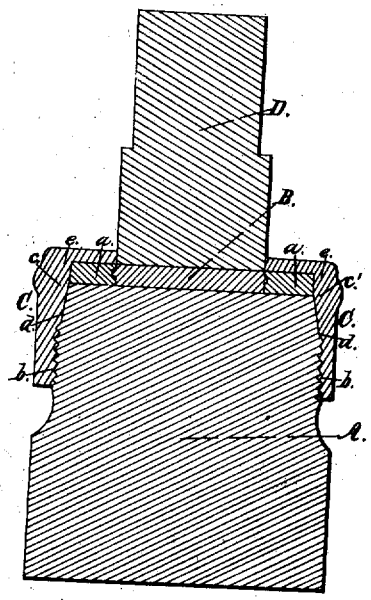
Figure 3:
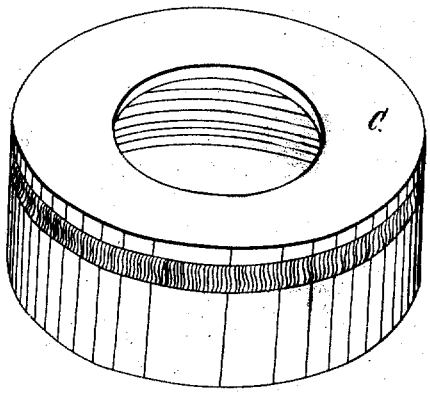
Figure 4:
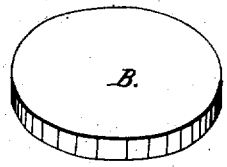
Figure 5:
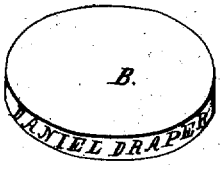

Figure 1 is a perspective view of the block upon which are placed the sectional dies, into which the edge of the blank is pressed, in order to produce the desired type-letters, figures, or characters thereon. Fig. 2 is a central vertical section representing the type-block in place and the mechanism which I employ for imparting pressure thereto. Fig. 3 is a perspective view of the clamping-nut for holding the sectional dies in place. Fig. 4 is a perspective view of the blank before being submitted to pressure to form the type-characters upon its edge. Fig. 5 is a perspective view of the type-block, with the required figures raised thereon.

Various means have been employed for producing letters, figures, &c., on the edges of type-blocks, among which may be enumerated the following—viz: They have been struck up on a strip of metal, and then soldered into recesses provided for their reception in the type-wheel, and the characters have been cast in soft metal and electroplated; but when made in either of these ways they failed to possess the degree of durability or hardness required. A method styled "milling" has been employed, in which the wheel bearing the dies has been rolled over the edge of the type-block. By this method, however, the characters were very imperfectly formed. They have also been produced by a tool which acted upon the interior of a metal ring, which was forced thereby into the die bearing the required impression, after which the ring was sprung over or soldered upon the central or solid portion of the block, and the characters have been engraved upon the block itself; but both of these methods consumed considerable time, and were consequently very expensive.

To overcome the objections above mentioned is the purpose of my invention, and to which end I subject the type-block to pressure in suitably-formed dies in such manner that the material of the block shall be spread laterally in a direction at right angles to the direction of the pressure applied, and be forced or squeezed into dies or cavities formed in sectional metal plates, which are securely held in place during the application of the pressure to the block, and when the impression is made, may be readily separated to admit of its removal.

To enable others skilled in the art to understand and use my invention, I will proceed to describe the manner in which I have carried it out.

In the said drawings, A is a metal block secured immovably in place by screws or otherwise to a solid bed-piece. Upon the upper surface of the block A are placed four or more curved sectional pieces, *a*, the inner edges of which bear the design of the type letters, figures, or other characters to be formed on the metal type-block B, which is placed inside the space inclosed by the sectional pieces *a*, which serve as dies into which the edge of the blank is forced to receive the impression. Near the upper end of the block A is formed a screw-thread, *b*, over which fits a corresponding thread cut on the inner surface of a nut, C′, which is made slightly conical or tapering inward from the point *c* to the point *d*, in order that when the nut is screwed down upon the block A this conical portion *c d* will be brought in contact with the outside of the sectional pieces *a*, and wedge or forcibly bind them around the type-block B, and thus securely clamp them in place so as to effectually resist any tendency to spread or separate them when pressure is being applied by the piston or plunger D upon the side or surface of the type-block. The diameter and height of the interior from *c* to *e* of the clamping-nut C is made to conform exactly to the outer diameter and height of the sectional dies *a*, when closed around the block B, that they may be prevented from yielding laterally or vertically when the pressure is being applied.

When the impression is formed, the clamping-nut C is unscrewed, thereby allowing the sectional dies to be separated from the type-block B to admit of its removal.

A drop-press, hammer, screw, or hydraulic pressure may be employed to force the metal into the dies, and the pressure may be applied from below or in any other desired direction, which should always be at right angles to the surface to which it is applied.

In the foregoing description I have spoke of producing characters upon the edges of metal blocks for hand-stamps, but it is evident that the method above described may be applied for producing types on blocks for various other purposes without departing from the spirit of my invention.

What I claim as my invention, and desire to secure by Letters Patent, is—

1. The combination of the within-described devices for producing letters, figures, &c., upon the edges of type-blocks for hand-stamps and other purposes, substantially as set forth.

2. As a new article of manufacture, a type-block, with letters, figures, or characters produced thereon, in the manner substantially as described.

DANIEL A. DRAPER.

Witnesses:
FRANCIS DRAPER,
S. S. STOUT.